May 6, 1941.  E. L. WYLIE  2,241,026

MOTOR MOUNTING

Filed July 5, 1939

INVENTOR.
E. L. Wylie
BY
ATTORNEY.

Patented May 6, 1941

2,241,026

UNITED STATES PATENT OFFICE 2,241,026

MOTOR MOUNTING

Ernest L. Wylie, St. Louis, Mo.

Application July 5, 1939, Serial No. 282,863

4 Claims. (Cl. 248—358)

This invention relates to motor mountings or engine mountings for automotive vehicles. Conventional forms of such mountings employ attachment plates bonded to rubber inserts or cores, but in practice the rubber deteriorates under the action of oil, resulting in excessive "floating" of the engine.

Another common form of engine mounting comprises an oblong base plate carrying spaced bearing lugs or crowns seated upon rubber cushions, the flange of the timing gear cover being bolted to the upturned lugs. But the rubber incorporated in this form of mounting is also open and exposed freely to the action of oil. In addition the incessant vibration of the engine causes the bearing lugs to wear depressions in the flange of the timing gear cover, thereby to a degree throwing the timing scheme out of harmony.

It is the purpose of the present invention therefore, to provide forms of engine mountings, particularly for the front end of the engine, so designed as to protect the rubber parts of the units from the action of oil.

Another object is to provide a form of engine mounting adapted to compensate for the said wear on the timing gear cover.

Other objects are to provide forms of engine mountings eliminating the possibility of metal to metal contacts, mountings including cup-like covers or shields for protecting the rubber bushings from oil, and mountings having means for taking up unnecessary "play" of the parts so as to reduce the "float" of the motor.

The accompanying drawing shows certain preferred forms and structural features of the invention. In the drawing.

The invention is designed for laterally anchoring the frontal gear cover A of the motor H, by its base flange B to the cross-bar C of the chassis (not shown).

Figure 1:
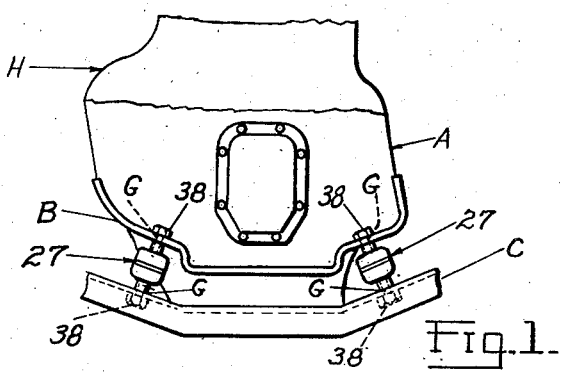
Figure 1 is a front elevation showing a modified form of mounting as applied to another form of engine mounting and assembly, the upper part of the gear cover being broken away to show the motor.
Figure 2:
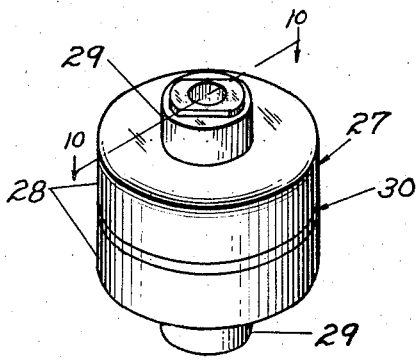
Figure 2 is an enlarged detail of a mounting unit as shown in Figure 1.
Figure 3:
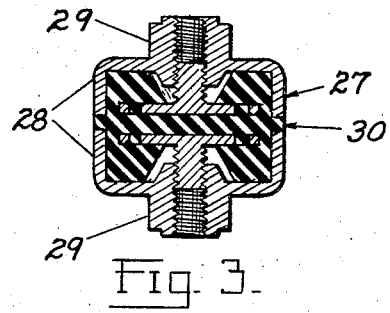
Figure 3 is a section on the line 10—10 of Figure 2.
Figure 4:
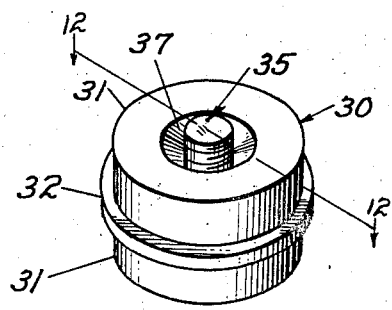
Figure 4 is a detail of the rubber insert, core or cushion employed in the assemblies of Figures 1 to 3.
Figure 5:
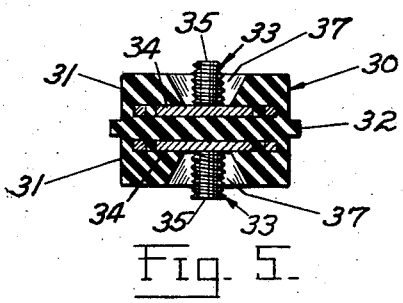
Figure 5 is a section on the line 12—12 of Figure 4.
Figure 6:
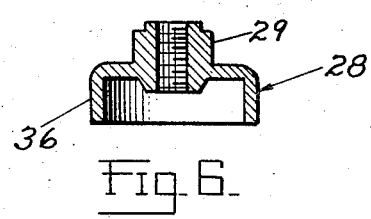
Figure 6 is a vertical section through one of the cupped caps or core holders shown in Figures 1 to 3.

For the lateral mode of mounting as illustrated in Figures 1 to 6, mounting units 27 are provided, the same comprising a pair of cupped, metal shells, shields or covers 28 having bored and interiorly threaded bearing lugs or crowns 29 extended centrally or axially therefrom. Each such pair is thus adapted to enclose at opposite sides a complemental and preferably integral core, insert or cushion 30 of molded rubber or other resilient material, and comprising upper and lower cylindrical counterparts 31 demarked by a central peripheral ring of rubber 32. Each end or counterpart 31 has embedded therein a metal anchor 33 comprising a metal disk 34 centrally embedded in the part 31 and from which is rigidly extended a centrally located, exteriorly threaded bolt or stud 35 adapted to threadedly engage the interiorly threaded bearing lug 29 of a cover 28, and to pass partly through the same. The covers 28 are mounted on opposite sides of the cushion core or insert by screwing same firmly down upon the threaded and extended ends of the bolts 35, the inwardly turned margins 36 of the covers bearing upon the ring 32. For providing a better threaded connection upon the bolts, the tapped lugs 29 may be extended somewhat inwardly of the covers, as shown in the drawing, and the cores may be cut away there around as indicated at 37, thus providing also for some inward spread of the cores under pressure.

These mounting units are designed to replace conventional mounting elements (not shown), and are mounted laterally between the upwardly turned or flared side margins of the gear cover base flange B and the similarly turned ends of the cross-bar C, as clearly shown in Figures 1 to 6. The installation is effected by raising the front of the engine H, inserting the units, one at each side, in alignment with the bolt holes G conventionally provided in the base flange B and cross bar C for regular mountings, and then passing threaded studs or bolts 38 through these holes into the tapped lugs 29. Adjustment of the covers 28 by rotation either way upon the bolts 35 regulates, as before, the degree of "float" of the motor or engine. The cupped covers exclude oil from the rubber cores, and the said mountings absorb or minimize, the down-thrusts and recoils of the engine in motion.

As a matter of course if other means of linking the engine and chassis were to be employed than through the flanged gear cover and cross-bar here described, the form of the invention might be readily adapted to such new situation. Likewise the mountings may be adapted for use at the rear of the engine, if desired.

While I have here shown and described certain embodiments and physical structures of the invention, the same may be modified within the scope of the claims.

I claim:

1. In a motor mounting, a pair of cupped covers having bored and interiorly threaded bearing lugs mounted centrally thereon, a complemental resilient core comprising opposed counterparts demarked by an intermediate, resilient peripheral band, anchors embedded in the counterparts of the core, the said anchors including exteriorly threaded bolts extended oppositely in alignment from the core and adapted to threadedly engage at each side the interiorly threaded bores of the bearing lugs of the covers and to pass partially therethrough, the remaining portions of said threaded bores of the lugs being adapted to engage at either side threaded bolts as employed for anchoring the motor to the chassis whereon the motor is to be mounted, the inwardly turned margins of the covers being adapted to close at either side, upon the said peripheral band of the core.

2. In a device of the kind described, a cylindrical, resilient core, anchors seated in the core in opposed relation, bolts seated axially in the core and extended oppositely in alignment from said anchors, complemental, rounded and cupped covers fitted over the ends of the core, said covers having integral centrally located threaded lugs, the inner ends of the lugs threadedly engaging the outer ends of the anchor-bolts, and the outer ends of said lugs being adapted to engage connections, as for anchoring a motor to its chassis.

3. In a device as defined in claim 2, the said resilient core being cut away around the said bolts to accommodate compression of the core.

4. In a device as defined in claim 2, the said covers through the threaded engagement of their lugs with the anchor bolts, being rotatably and adjustably mounted upon and over the said core.

ERNEST L. WYLIE.